July 23, 1957   C. M. PETERS ET AL   2,800,138
AUTOMATIC TANK SWITCHING SYSTEM AND APPARATUS THEREFOR
Filed July 26, 1955   6 Sheets-Sheet 3

Vernon B. Scott
Clifford M. Peters
INVENTORS

BY

ATTORNEYS

July 23, 1957

C. M. PETERS ET AL 2,800,138

AUTOMATIC TANK SWITCHING SYSTEM AND APPARATUS THEREFOR

Filed July 26, 1955

Vernon B. Scott
Clifford M. Peters
INVENTORS

BY Browning, Simms & Hyer

ATTORNEYS

United States Patent Office 2,800,138
Patented July 23, 1957

2,800,138

AUTOMATIC TANK SWITCHING SYSTEM AND APPARATUS THEREFOR

Clifford M. Peters, Longview, and Vernon B. Scott, Houston, Tex., assignors, by mesne assignments, to U. S. Industries, Inc., a corporation of Delaware Application July 26, 1955, Serial No. 524,357

28 Claims. (Cl. 137—122)

This invention relates to automatic well producing systems and to controls for selectively and sequentially controlling the flow of a fluid to or from various ones of storage tanks of a multiple-tank battery. In one of its aspects, it relates to non-bleed pneumatic control systems useful to automatically control the production of oil from wells into a multiple-tank battery and, if desired, for emptying such tanks. In still another of its aspects, the invention relates to valves particularly useful in such systems and to arrangements of such valves in a control system.

In the petroleum production industry, as well as others, it is common to use a battery of tanks for temporary storage of crude oil or other products. For example, in the production of oil wells, it is common to provide a battery of tanks serving a multiplicity of wells for temporary storage of the oil production prior to its delivery to the pipeline. In order to gauge the tanks and determine how much oil is to be delivered to the pipeline, the production is usually flowed into a tank until it is filled whereupon the production is switched to a second tank. While the second tank is filling, the first one is gauged, its temperature taken and any other measurements made whereupon it is emptied into the pipeline. In the usual installation, at least three and frequently six or more tanks are provided in the tank battery to provide ample storage and flexibility of operation.

Heretofore, it has been a common practice to equip the tank battery with manually operated valves to control flow into the various tanks. This arrangement has necessitated the pumper or gauger be present when a tank is about to become filled in order that the production can be switched into an empty tank. This has not always been possible and as a result, the gauger or pumper will frequently switch a tank before it is entirely filled in order not to have to wait on it to become completely filled. At other times, tanks have been known to run over due to the pumper miscalculating the time when it will become filled. In any event, the pumper must be present each time a tank is to be switched.

To eliminate the human element and manpower needed to switch the tanks, various so-called "automatic" tank switching systems have been suggested. In many of these systems the controls for automatically switching from one tank to another must be manually re-set after a tank has been emptied. The nature of the controls is such that their re-setting will in itself interrupt flow to a succeeding tank in the battery even though such tank is not yet filled. As a result, the re-setting must await filling of the last tank in the battery and the pumper must always be present when the last tank becomes filled even though preceding tanks are empty and otherwise ready to receive production. In other switching systems, complicated electrical controls are employed and in many locations, electricity is not available for their operation. Also such electrical systems have not provided an interlocking arrangement whereby flow into a succeeding tank in a series is positively prevented while a preceding tank is being filled or whereby opening a tank to production in itself positively closes all succeeding tanks to production. Further, the prior art systems have not provided any system where a tank, upon filling, is positively locked out of production until the pumper determines it is available to receive production.

It is, therefore, a primary object of this invention to provide a simple tank switching system for controlling the filling or emptying of a plurality of tanks in a predetermined sequence, the control system providing an interlocking which assures that only one tank at a time can receive or discharge fluid and that upon beginning to fill or empty any tank, all others are automatically prevented from receiving or discharging, respectively, any fluid.

Another object of the invention is to provide a tank switching system in which a plurality of controls are provided, one for each tank, the controls being interlocked by passing the energy for opening flow control valves serially through the control system in such a manner that only one tank at a time can be opened to receive or discharge fluid and upon becoming filled or emptied, the flow of fluid is switched to another available tank and if all tanks are filled, the fluid system is automatically closed down by a master valve.

Another object is to provide a tank switching control system in which the flow valves of the tanks are actuated responsive to the flow of energy in a conductor common to all the flow valves, there being provided switching means for each tank arranged so that flow of energy through the common conductor can be to but a single flow valve to open the same.

Another object of this invention is to provide a pneumatic type of tank switching control system in which pilot valves are employed to sequentially apply the pressure of a pneumatic medium to flow valves each controlling flow into or from a tank and upon a tank becoming filled or emptied, to switch such medium to the pilot valve of a succeeding tank, the pilot valve of a filled tank remaining in a position to prevent further flow into such tank not only until all such succeeding available tanks have been filled but also until the filled tank has been emptied and determined to be ready to again receive fluid.

Another object is to provide such a pneumatic system in which the pilot valves are moved to switch the pneumatic medium from the respective flow valves controlled thereby to a succeeding tank's flow valve by an impulse received from a level control in the tanks, the pilot valves remaining locked in their switched position until the respective tanks are emptied and then being moved to a position to permit application of pneumatic medium to their respective flow valve responsive to another tank becoming filled whereby positive switching for flow to only one tank at a time is accomplished.

Another object of the invention is to provide a pneumatic actuated tank switching control system in which the control elements are arranged so that the system does not bleed any substantial amounts of the pneumatic medium to the atmosphere, that is, it is of the non-bleed type.

Another object is to provide a tank switching control system for automatically switching fluid flow from one tank to another and upon one tank being filled and fluid switched therefrom, to automatically start emptying such tank.

Another object is to provide such a control system in which the inlet flow valve to a tank is positively locked in closed position while the outlet flow valve is open.

Another object is to provide a tank switching control system in which a signal is employed to not only close a flow valve in one conduit connected to a tank but also to open a flow valve in another conduit connected to the tank, the system at the same time switching fluid flow to another tank.

Another object of the invention is to provide a tank switching system in which tanks are switched sequentially and serially and in which means are provided for automatically closing a master valve in the gathering system upon all of the tanks becoming filled and to open such valve when one or more tanks are rendered ready to again receive fluid.

Another object of the invention is to provide a production gathering system in which wells are switched one after another for flow during a predetermined interval into one or both of two test separators in parallel, the system being provided with control means for interrupting the switching of wells whenever either separator becomes too full and no matter which is in operation.

Another object of this invention is to provide a tank switching system in which a master valve in a gathering system is automatically closed upon all the available tanks in the system being filled and is automatically opened upon one of the tanks being placed on the line to receive production.

Other objects, advantages and features of this invention will be apparent to one skilled in the art upon consideration of the written specification, the appended claims and the attached drawings wherein:

Like characters of reference are used throughout the several views to designate like parts.

In general, this invention provides switch means for each of the inlet flow valves of the individual tanks of the tank battery which are operable to apply an energizing medium to the first flow valve so that its tank can become filled. As soon as the first tank is full, the switching means shuts off the flow of energizing medium to the first flow valve so that it can close and then transmits the energizing medium to a second switch means to cause the second tank's flow valve to be opened. This switching and transmission continues until all of the available tanks in the battery have been filled. When the last available tank in the series has been so filled, the energizing medium is transmitted to the switching means of the preceding tanks to urge them to a position to again apply the energizing medium to the flow valve of the first tank in the series and if it is not available to the flow valve of the next available tank. The switching means blocks flow to a succeeding flow valve until all preceding available tanks have been filled. By this means, an "interlock" is provided whereby all available tanks must be filled serially and two or more of them cannot be placed on the line at the same time. The system also provides means whereby each tank after it has been filled is automatically locked out of the system until the pumper or gauger has finished gauging and determines the tank is ready to go back on the line. Thus, if a tank is to be "held" for a period of time or if it is being emptied after succeeding tanks in the series have become filled, the system operates to skip such a tank and to hunt through the other tanks until the first available one in the series is found. Thereupon, flow is directed into such tank.

It is also possible with this system to complete the emptying of an intermediate tank in the series after the last one has been filled and yet the system will operate to automatically divert flow into such intermediate tank after the preceding ones have been filled. Such an arrangement avoids skipping an available empty tank even though it did not become available until after the last tank in the series has been filled. This affords considerable flexibility in the emptying operations without interrupting the sequential filling of the tanks.

The switching control system described generally above is also applicable to the automatic emptying of tanks and, indeed, provision is made to interlock the inlet control system for a series of tanks with an outlet control system therefor in such a manner that the entire filling and emptying operation is made automatic. In a preferred form of such a combined system, the opening of an outlet flow valve is automatically effected upon closing an inlet flow valve but not before by using the same source of signal for operating both valves. Upon opening the outlet valve, an interlock is established with the inlet valve preventing it from opening as long as the outlet is open. Once the outlet valve is closed, the inlet valve then is subject to control by the inlet control system for opening in the desired sequence with other inlet valves.

Means are also provided in this system for closing a master valve in a gathering line leading to the tanks upon all of the tanks becoming filled. This means can also automatically open the master valve when one or more of the tanks are made available to receive production. Also, there can be provided a means for closing down a switching system for testing wells upon either one of two separators receiving production from the wells becoming overly full or inoperative.

Figure 1:
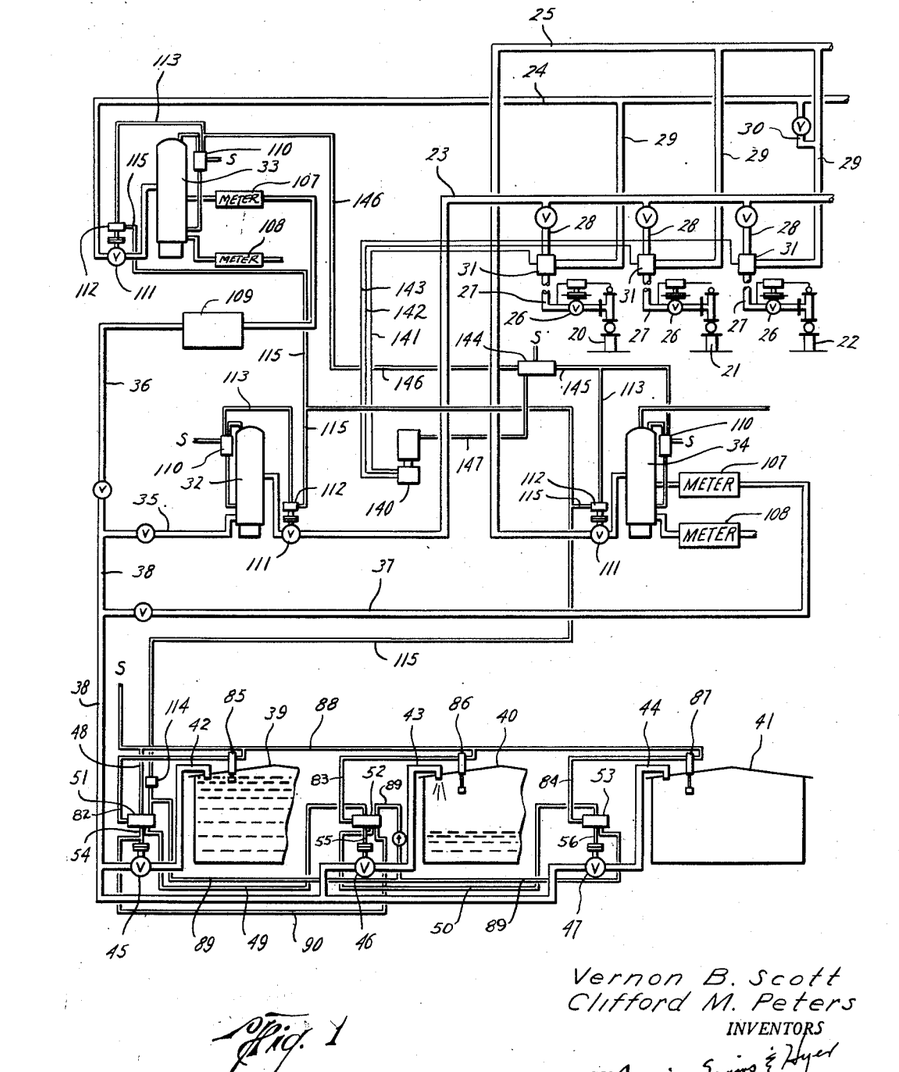
Fig. 1 is a schematic layout of a well producing system including a battery of three tanks and illustrates one embodiment of the invention.

Thus, referring to Fig. 1, where there is shown a schematic layout of a typical three tank battery and well gathering system as well as one embodiment of the system of this invention particularly adapted for such an arrangement.

Thus, a plurality of wells 20, 21 and 22 are piped into manifolds of a gathering system including a production manifold 23, a dirty oil test manifold 24 and a clean oil test manifold 25. At each well head, there is preferably provided a flow controller 26 adapted to shut in a particular well when the pressure downstream of the controller becomes either too high or too low. From these controllers, gathering lines 27 extend for connection with one or more of the various manifolds via conduits 28 (to the production manifold 23) and branch conduits 29 and 30 (to either or both of the dirty and clean oil test manifolds 24 and 25). Three-way valves 31 can be provided to direct flow from each well into one or the other of conduits 28 and 29 for a purpose to be more fully described below.

While only three wells have been shown in the drawing, it will be understood that any number can be hooked into the various manifolds in any desired manner.

In any event, the production from the various manifolds is conducted to a production separator 32, a dirty oil test separator 33 and a clean oil test separator 34. The oil leaving these various separators then flows via flow lines 35, 36 and 37 to a tank header 38. While three separators have been shown, it is contemplated that all or any number of them can be eliminated or other ones added with a simple modification of elimination of applicable controls as will be made more evident below.

*Tank Switching Control System*

The tank battery can compromise a plurality of tanks 39, 40 and 41 each of which are connected to header 38 by inlet conduits 42, 43 and 44 respectively. Disposed in these inlet conduits are individually controlled flow valves 45, 46 and 47 adapted to be opened and closed to control flow into the tanks. The illustrated valves are of the normally closed diaphragm type of motor valve which is operable by the application of a pneumatic pressure to the diaphragm.

For controlling the flow valves and applying energy or pressure thereto to open the same, a common means is provided for conducting energy, such as fluid under pressure, from a source S to all of the tanks and their inlet valves. Such means can include conduit portions 48, 49 and 50 connecting switch means, such as pilot valves 51, 52 and 53, in series with each other to the source S. As will be more fully described hereafter, each of the pilot valves has an inlet and two outlets as well as a valve member for shifting flow from the inlet to be to one or the other of the outlets. The inlet to pilot valve 51 is connected to the source S while one of its outlets is connected by conduit 49 to the inlet of pilot valve 52. The latter in turn has one of its outlets connected via conduit 50 to the inlet of pilot valve 53 and so on through the series. The other outlets of the pilot valves are connected by conduits 54, 55 and 56 respectively to flow valves 45, 46 and 47 to control opening and closing of the same. With this arrangement and assuming that all of the tanks are emptied and ready to be filled, fluid pressure from source S can be applied through pilot valve 51 to flow valve 45 to open it and upon tank 39 becoming filled, pilot valve 51 is actuated by means to be described later to switch pressure fluid to conduit 49 and pilot valve 52. This causes flow valve 46 to open and upon tank 40 becoming filled, pilot valve 52 is actuated to shift pressure fluid to conduit 50 and pilot valve 53.

Figures 2, 3, 4:
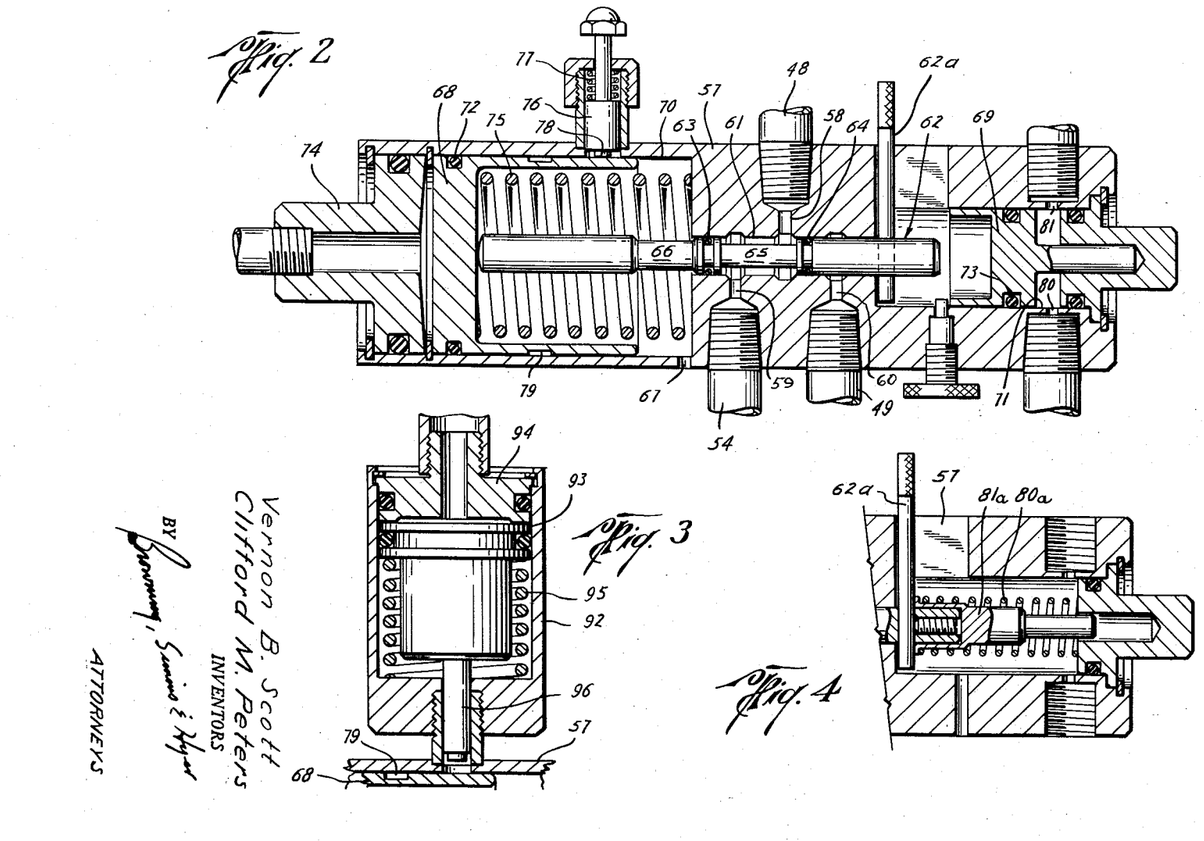
Fig. 2 is a cross-sectional view of one embodiment of a pilot valve useful in the system of this invention to control the switching of the various tanks.
Fig. 3 illustrates an alternative detent or locking means useful with a valve of the type shown in Fig. 2.
Fig. 4 is a partial view showing a modification of the valve of Fig. 2 particularly adapting the valve for use with the last one in the series of tanks.

Before proceeding further with the description of the tank switching control system, a detailed description of preferred forms of pilot valves 51 through 53 will be given to aid in the further understanding of the control system. Referring to Fig. 2, a pilot valve is shown which is suitable for use as pilot valves 51 and 52 of Fig. 1. This valve comprises a body 57 having an inlet port 58 to which conduit 48 (or 49) can be connected. A pair of outlet ports 59 and 60 are also provided for respective connection with conduits 54 (or 55) and 49 (or 50). These various ports communicate with a bore 61 through which flow is controlled by a valve member such as shiftable plunger 62. The plunger has spaced seals, such as O-rings 63 and 64, with an intermediate reduced diameter portion 65 arranged so that when the plunger is in the position shown in Fig. 2, communication between the ports 58 and 59 is effected while port 60 is blanked off from port 58. This position will, for convenience, be hereafter referred to as the "fill" position. Upon shifting plunger 62 to the right in Fig. 2, seals 63 and 64 are moved so that port 58 is placed in communication with port 60 and out of communication with port 59. The latter in turn is in communication via reduced diameter portion 66 with a vent 67 in the valve body. This position will hereafter be referred to as the "switched" position. With this construction pressure fluid from conduit 48 can be applied through conduit 54, with the valve plunger in fill position, to flow valve 45 to open it. Upon shifting of plunger 62 to switched position, the pressure fluid is diverted or switched to the next succeeding pilot valve while flow valve 45 is bled off through vent 67 thereby permitting it to close.

Means are provided for shifting plunger 62 between its fill and switched positions responsive to signals received from exteriorly of the valve. Thus, there can be provided two pressure responsive means in the form of pistons 68 and 69 respectively slidable in bores 70 and 71 of the valve body and having a sliding seal therewith as by O-rings 72 and 73. Piston 68 is arranged so it can abut plunger 62 to move it to fill position and then move relative to the plunger to a retracted position without moving the plunger. The piston's movement in one direction is effected by the application of a pressure medium through an inlet fitting 74 and in the other direction by resilient means such as spring 75 so that when sufficient pressure is applied through fitting 74 to overcome spring 75, the piston will move to the right as shown in Fig. 2 to shift the valve plunger to fill position.

Detent means are provided which are operable and effective to maintain the piston in switched position where it prevents shifting of the valve plunger to fill position until the detent means is released. As shown in Fig. 2, the detent means comprises a manually operable plunger 76 which is spring pressed by spring 77 to cause an end 78 to ride against the piston and eventually drop into groove 79. Hence, once piston 68 has shifted the valve plunger, it is prevented from returning to its retracted position by the detent means and this retains the valve plunger in its switched position. The purpose of this arrangement is to enable a tank to be locked out of service until the pumper has determined it should be placed back in service which he can do merely by lifting up on the detent so spring 75 can move the piston.

Piston 69 is likewise shown to be separate but abuttable with the valve plunger upon application of fluid pressure thereto from one of ports 80 or 81. It will be noted that the cross-sectional area of piston 69 is made sufficiently smaller than that of piston 68 that pressure acting through ports 80 or 81 cannot develop a force sufficient to move the plunger to fill position until pressure on piston 68 has been released.

In Fig. 4 is shown a partial view of a valve useful as the last pilot valve in the series on the tank battery. In Fig. 1, this would correspond to pilot valve 53. The valve of Fig. 4 can be exactly like that of Fig. 2 except that piston 69 is replaced by a resilient means such as spring 80a and a spring guide and retainer 81a. This arrangement constantly urges the valve plunger to fill position and no pressure fluid is required for such shifting.

In each of the valves of Figs. 2 and 4, a sight index and manual shifter can be provided in the form of a pin 62a connected to the valve plunger.

Reverting now to the system illustrated in Fig. 1, the inlet fittings 74 of the various pilot valves are connected respectively by conduits 82, 83 and 84 to liquid level controllers 85, 86 and 87. These controllers are also connected to source S by conduit 88 and are arranged to transmit pressure fluid from this common conduit to the various pilot valves upon the respective tanks becoming filled to a predetermined height. Then as each tank becomes filled, the liquid level control applies pressure against a piston 68 of the respective pilot valves to shift the valve plungers to switched position whereupon the flow valve to such tank is closed by bleeding off through port 59 and vent 67 of the respective pilot valve. Upon the level of a tank decreasing from the predetermined height the level controllers automatically close off the pilot valve's communication with conduit 88 and bleeds off the pressure theretofore applied to the pilot valve piston 68.

Means are provided for shifting or positioning the pilot valves of all available tanks in the series so that the inlets of the pilot valves are in communication with the outlet leading to the flow valves of the tanks. This means is responsive to filling of the last tank in the series and is operative to apply the shifting force to all pilot valves preceding such tank. Thus, the outlet port 60 of pilot valve 53 is connected via conduit 89 to ports 81 of pilot valves 51 and 52. Then upon liquid level control 87 of the last tank causing pilot valve 53 to be shifted to switched position, pressure fluid from source S passes through the preceding pilot valves 51 and 52 as well as pilot valve 53 to be applied through ports 81 of pilot valves 51 and 52 to urge the valve plungers thereof to fill position.

Figure 5:
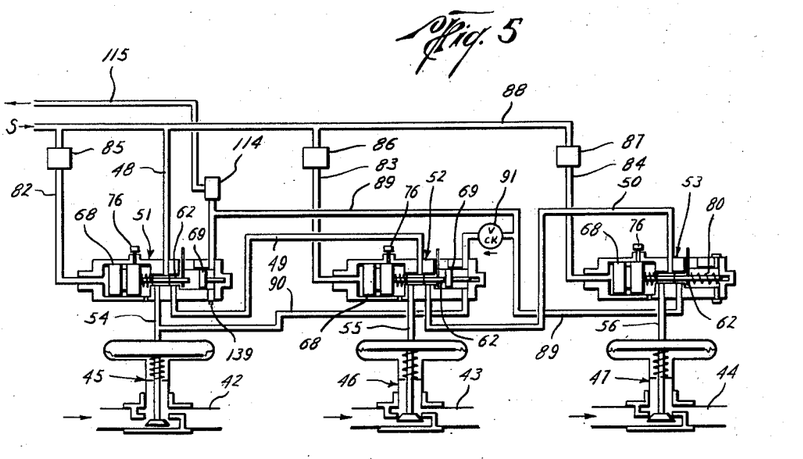
Figs. 5 and 6 are somewhat schematic illustrations showing the mode of operation of one embodiment of a tank switching system in accordance with this invention and further illustrates the form shown in Fig. 1.
Figure 6:
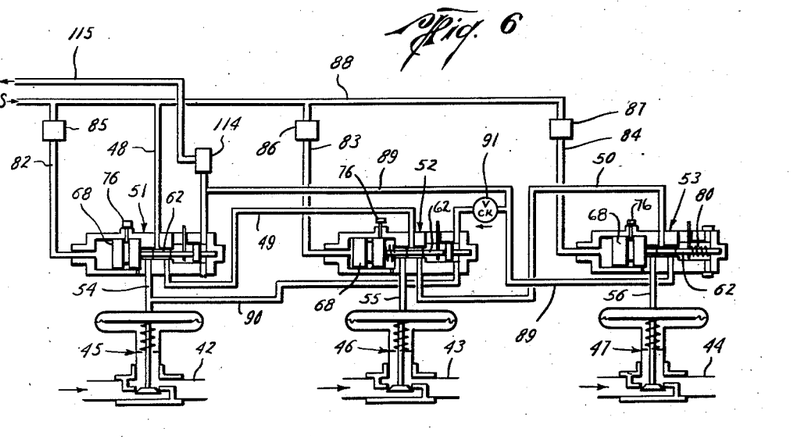

In describing the operation of the system illustrated in Fig. 1, simplified diagrams have been provided in Figs. 5 and 6. In Fig. 5, the system is positioned for fluid to flow into tank 39 while tanks 40 and 41 are empty and ready to receive fluid in turn. Pressure fluid, say at 25 p. s. i., flows from source S through conduit 48 and thence through pilot valve 51 to act against the diaphragm of flow valve 45 to hold it in open position. As soon as tank 39 fills sufficiently, liquid level control 85 applies pressure from source S through conduit 82 against piston 68 of the pilot valve to cause the piston and valve plunger to move to switched position. This movement bleeds off flow valve 45 and permits it to close. At the same time, piston 68 is locked by detent 76 in its shifted position which, of course, prevents opening valve 45 until the detent is released.

Pressure fluid from source S has by such movement been switched to flow through pilot valve 51, conduit 49, pilot valve 52 to flow valve 46 to open it. As soon as tank 40 fills, liquid level control 86 will cause pilot valve 52 to be shifted to close valve 46 and apply pressure fluid via conduit 50 to pilot valve 53. Then upon filling of tank 41, the same manipulation of pilot valve 53 occurs whereupon pressure from source S, instead of being applied to the next pilot valve, is brought back through conduit 89 to be applied against each of pistons 69 in pilot valves 51 and 52. If it is assumed, for example, that tank 40 has been emptied before tank 41 completes its filling, the pumper can raise the detent on pilot valve 52 so that its piston 68 moves to retracted position as shown in Fig. 6. This movement does not move the valve plunger but it remains in the position shown in Fig. 6. Then upon filling of the last tank, pressure applied through conduit 89 shifts the plunger of pilot valve 52 cutting off the supply of pressure to pilot valve 53 and diverting it to flow valve 46 which opens. In Fig. 6, it is assumed that tank 39 has not been emptied or for some reason is not to be refilled and therefore the detent on its pilot valve has not been released. As a result, the application of pressure to this pilot through conduit 89 does not cause shifting of its plunger so that pressure fluid from source S continues to be applied through the pilot valve to the inlet of pilot 52. If tank 39 had been ready for filling and the detent on its pilot had been released, the pressure in conduit 89 would have been effective to shift the plungers of both pilot valves 51 and 52. This would cause pressure from source S to be applied first to flow valve 45 and then upon its tank's filling, to flow valve 46.

It may sometimes happen that one of the intermediate tanks in the series has been emptied and made available after the last tank has been filled. In such event, the release of the detent on the pilot valve of such tank would not cause shifting of the plunger so that the tank could be filled in its proper turn. To avoid this, the conduit 90 is provided to communicate between port 59 of one pilot valve to port 80 of the next succeeding pilot valve. Then pressure acts through conduit 90 during the filling of tank 39 to immediately shift the valve plunger of pilot valve 52 upon release of its detent. Thus, the detent of a succeeding pilot valve can be released any time during the filling of a preceding tank and yet such pilot valve will be moved to fill position so that the tank it serves will not be skipped. To prevent pressure from being applied to conduit 89, a check valve 91 can be supplied in each branch of this conduit leading to the intermediate pilot valves. Of course, conduit 90 could be eliminated with the result that an intermediate tank which has been emptied and made available after the last tank had been filled would be skipped until the last tank had been again reached whereupon its pilot would cause the proper shifting of the pilot on the intermediate tank.

Figure 7:
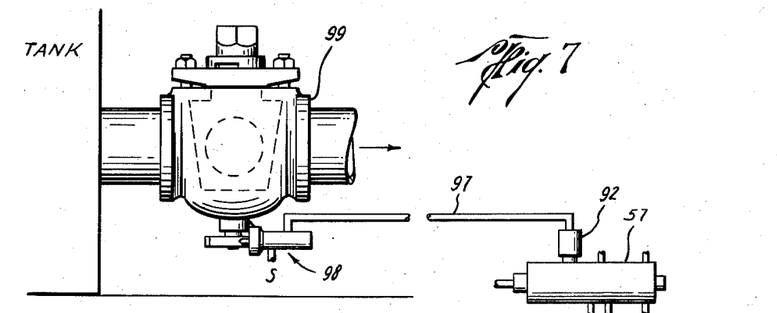
Fig. 7 illustrates an outlet line from a tank with an arrangement whereby the detent mechanism of Fig. 3 can be used with the valve of Fig. 2 to automatically place such valve in condition to switch production into a tank merely by manipulation of the outlet valve from such tank.
Figure 8:
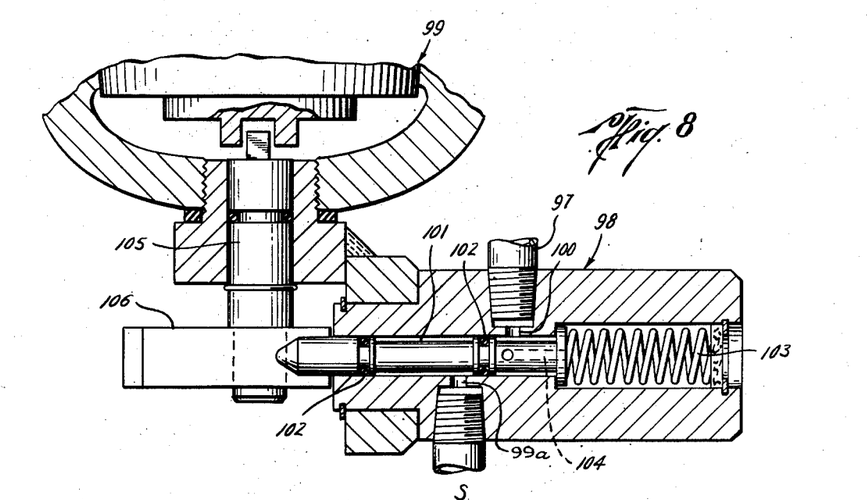
Fig. 8 is a partial view in cross-section showing a part of the apparatus of Fig. 7.

Referring now to Figs. 3, 7 and 8, there is shown a detent means for automatically holding the pilot valves in switched position upon opening of an outlet flow valve from a tank and then releasing the detent responsive to closing of the outlet flow valve. With this arrangement, the detent means of Fig. 2 is replaced by that of Fig. 3. The latter includes a cylinder 92 housing a piston 93, the latter being movable in one direction by fluid pressure applied through fitting 94 and urged in another direction by spring 95. The piston carries a detent part 96 which upon application of pressure to the piston, is engageable with groove 79. Fitting 94 is connected by conduit 97 to a bleed type pilot 98 which is actuated by the outlet flow valve 99 from the tank. The pilot has an inlet port 99a which is connectible to a source S of fluid pressure and an outlet port 100 communicating with conduit 97. A valve plunger 101 carries spaced seals 102 and is shiftable against the force of spring 103 to place ports 99 and 100 in communication. When the plunger is in the Fig. 8 position, port 99a is blanked off while port 100 is vented through passage 104. Flow valve 99 is somewhat altered by adding a rotatable shaft 105 which is turned upon turning of the valve plug or member so that an arm 106 will engage plunger 101. Arm 106 is so positioned that its moves plunger 101 to place ports 99a and 100 in communication at all times when valve 99 is open. Upon closing valve 99, the arm moves away from the plunger permitting it to move and bleed off conduit 97. With this arrangement and upon fillng of a tank, piston 68 of the pilot valve will be retained in its switched position by pressure from the level controller until valve 99 is opened to drain the tank. Thereupon, pilot 98 causes pressure to be applied to piston 93 to detain piston 68 of the pilot valve as long as outlet valve 99 remains open. Upon closing of the latter, the detent is released.

*Production system control*

It is usual to employ separators for the purpose of separating water from the oil before the latter is passed to the tank battery. In the drawing, these are schematically illustrated as a production separator 32, a dirty oil test separator 33 and a clean oil test separator 34. The test separators are equipped with the usual oil and water meters 107 and 108 so that the production from each well can be singly passed into the separators to test the rate of flow thereof. The oil from the dirty test separator can be passed through a treater and gun barrel, designated symbolically at 109 and then the oil passed to the tank line 38.

Each of the separators is equipped with a liquid level control 110 which are here illustrated as being of the pneumatic type which applies pressure of a control medium from a source S to pneumatically actuated motor valves 111 in the inlet line to each separator to hold the same open while the liquid level in the separator is below a predetermined height. Upon such level rising to such height, pressure is bled off from the motor valves so that they can close and prevent further flow into the separators. In this connection, each of the motor valves is equipped with a shut-in pilot 112 controlling the application of the control medium through conduits 113 to the motor valves in such a manner that the motor valves automatically close upon all of tanks 39, 40 and 41 in the battery becoming full. Thus, each shut-in pilot is connected by a relay pilot 114 and conduit 115 to the tank switching control system above described.

Figure 9:
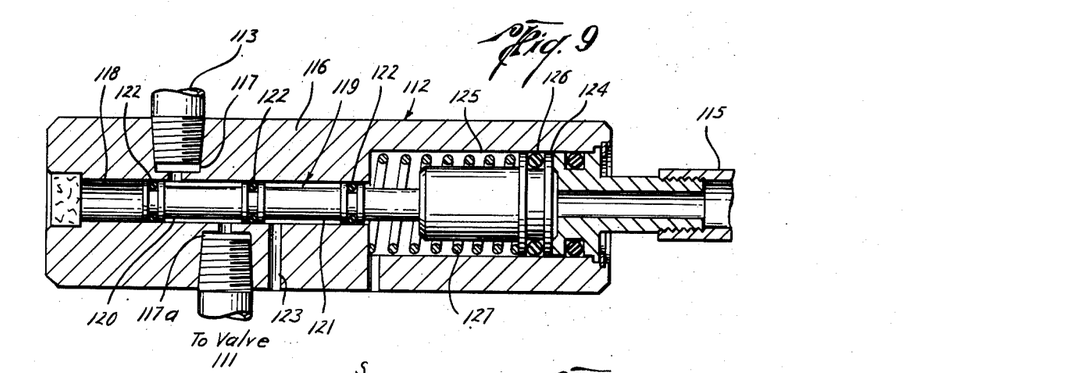
Fig. 9 is a view in section illustrating one form of a pilot valve embodying certain features of this invention for controlling a master valve in the production gathering system.

Further details of a suitable shut-in pilot are shown in Fig. 9. Referring to that figure, the valve comprises a body 116 having ports 117 and 117a to which can be connected conduits 113 and the one leading to a motor valve 111, respectively. Body 116 has a bore 118 in which is slidably disposed a plunger valve member 119. The latter has axially spaced apart reduced diameter portions 120 and 121 which are bounded on each of their ends by seals, such as O-rings 122, slidable in bore 118. A vent port 123 is likewise provided in the valve body to permit venting of a motor valve 111 when valve member 119 is properly positioned. Means are provided for shifting valve member 119 from one to the other of its operating positions responsive to a change in pressure of actuating medium applied thereto from conduit 115. Such means can comprise a piston 124 slidable in a bore 125 and having a seal 126 therewith. The piston can be biased in one direction by a spring 127 carried in the valve body and is movable in another direction by fluid pressure applied through conduit 115. With such construction and with the pressure of fluid from conduit 115 being less than that required to overcome spring 127, it will be seen that control medium from conduit 113 and a liquid level control 110 flows through port 117, around reduced diameter portion 120 and out through port 117a to the motor valve where it can operate to hold the valve in open position, for example. However, upon the pressure in conduit 115 increasing sufficiently, piston 124 and valve member 119 will move to position the intermediate one of seals 122 between ports 117 and 117a to stop flow therethrough and at the same time, port 117a will be connected via reduced diameter portion 121 to vent 123 thereby permitting venting of the motor valve to close the same. Thus it will be seen that the safety shut-in pilot valve comprises a means for normally permitting flow between two ports therein, such as to control a motor valve, and for interrupting such flow and venting one of the ports responsive to a changed condition of a control medium.

The signal for causing shut-in pilot 112 to close valves 111 is derived from the tank switching control system where it is generated responsive to all available tanks becoming filled. There is provided a time delay means operable to apply sufficient pressure to the shut-in pilots to cause them to vent their motor valves after the lapse of a predetermined time interval following the application of pressure to the pilot valves 51 and 52 to urge them to fill position. If none of the pilot valves move to such position, then the shut-in pilots close their motor valves. Further, the shut-in pilots automatically are moved to allow their motor valves to open upon one or more of pilots 51–53 being placed in fill position. Thus, relay pilot 114 (Figs. 1, 5 and 6) is connected to a branch of conduit 89 and to conduit 115. It comprises a body 130 having a piston 131 carrying a seal 132 slidably disposed in bore 133. The piston is urged by spring 134 to position seal 132 between an inlet 135 connected to conduit 89 and an outlet 136 connected to conduit 115. With the piston and seal thus positioned, conduit 115 is vented through vent 137 which venting is of course interrupted upon pressure being applied through conduit 89 to move piston 131. It will be noted that outlet 136 is provided with a restriction or choke 138. This choke is made sufficiently small that a predetermined time is required for the pressure to build up sufficiently in conduit 115 to cause shifting of the shut-in pilots 112 to close their motor valves 111 which time is longer than that required to shift one or all of pilot valves to fill position. If all the pilot valves are locked in switched position upon the last tank filling, the resultant pressure in conduit 89 cannot cause any of them to shift but instead holds piston 131 of the relay pilot in advanced position while conduit 115 is pressured up through choke 136 to cause shut-in pilots 112 to close their motor valves. As long as all the relay pilots are locked in switched position, pressure continues to be applied through the relay pilot to the shut-in pilots. However, upon one or more of the pilot valves having its detent released, pressure in conduit 89 bleeds off by virtue of choke 139 in pilot valve 51 whereupon the relay pilot shifts to vent conduit 115 and thereby cause the shut-in pilots to shift to permit their motor valves to open. It will be noted that the relay pilot-shut-in pilot arrangement provides a safety shut-in for the separators in addition to that provided by the high level controllers 110 on each separator.

In many instances, it is desirable to measure the production rate of the wells connected to a tank battery. This can be done by flowing the wells, one at a time, into one of the test separators. In some cases, the oil from a well will not need treatment before passing to the tanks and in such case, the well is connected into the clean oil test manifold. In others, the oil will need treatment and a well producing such oil is connected into the dirty oil test manifold. To automatically test a plurality of wells, means are provided for automatically switching the wells individually and one after another into communication with the appropriate one of the test separators for flow thereinto during a predetermined time interval. After one well has so flowed for such an interval, another well is automatically switched into the test separator and the first one cut out. Such means can include a sequence controller 140 having a control pressure conduit 141, 142 and 143 respectively connected to the three-way motor valves 31 at the well heads. The three-way valves are arranged so that upon application of the control pressure, production from the well will be diverted into one of conducits 29 (and 30 if open) to a test separator and upon removal of the control pressure, the production will be diverted through one of conduits 28 to the production manifold and production separator 32. Controller 140 is of the type which in a timed sequence will cause the application of control pressure to one of conduits 141, 142 or 143 to open one of valves 31 to cause flow to the test separator and after lapse of predetermined time, (e. g. 1 hour) will automatically remove the control pressure from such valve and apply through another of conduits 141, 142 or 143 to the next valve. In this manner, it is possible, for example, to open well 20 for one hour to the test separator, close it down, and immediately open well 21 to the test separator, for one hour, close it down, and then open well 22, etc. In this manner, testing of the various wells can continue in sequence for any desired individual intervals without attendance by a pumper or a gauger. In this regard, meters 107 and 108 can be of the type which record total flow or rate versus time.

Figure 10:
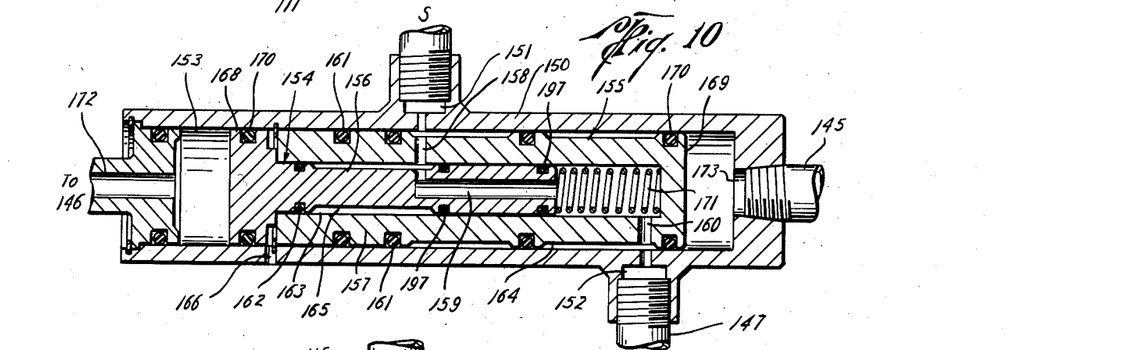
Fig. 10 is a cross-sectional view illustrating one form of a shut-off valve of this invention adapted to control an operating medium responsive to a change in either one or both of two control variables.
Figure 11:
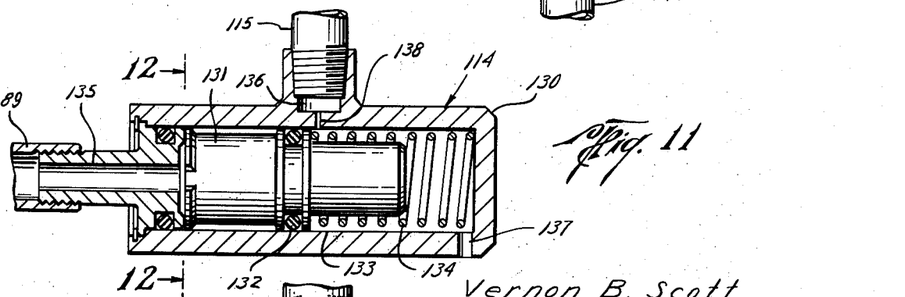
Fig. 11 is a sectional view illustrating a relay pilot valve useful in this invention to cooperate to shut down a gathering system when all of the available tanks in a battery become filled.
Figure 12:
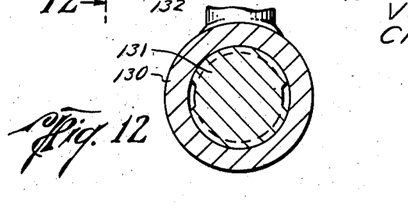
Fig. 12 is a section taken on the line 12—12 of Fig. 11.

As indicated above, production being tested may flow from one well to one of separators 33 and 34 and subsequently from another well to the other separator. If something should happen to one of the separators so that the level therein rises excessively, it should be shut in and the testing ceased until the trouble is remedied. To permit this, a safety shut-off valve 144 is provided which is responsive to both separators or either of them individually to render controller 140 inactive, that is, to shut off flow of control medium thereto. The shut-in pilot is connected to a source of actuating medium S and likewise by conduits 145 and 146 to each of liquid level controllers 110 to be influenced by pressure control medium therefrom. It also has a conduit 147 through which control medium from S flows to controller 140. A valve suitable for acting as a shut-off valve is shown in Fig. 10. In this figure, valve body 150 has an inlet port 151 adapted to be connected to source S and an outlet port 152 for connection with conduit 147. Disposed in a bore 153 in the valve body are two valve members 154 and 155 which are here illustrated as having telescoping portions 156 and 157, respectively. Flow passageways are provided in each of the valve members for fluid communication between inlet and outlet ports 151 and 152 with the valve members in one position. Thus, a passageway portion 158 is disposed in valve member 155 to communicate with a passageway portion 159 in valve member 154 which in turn communicates with a passageway portion 160 in valve member 155. With the valve members in the position shown in the drawing, fluid can flow freely from the inlet to the outlet port. However, upon movement of valve member 155 to its other position (to the right in Fig. 10), seals such as O-rings 161 are moved to be positioned on either side of inlet port 151 thereby blocking flow therethrough. The same movement of valve member 155 causes seal 162 to become unseated from the bore 163 of valve member 155 whereupon outlet 152 is vented to atmosphere via circumferential groove 164, passageway portions 160 and 159, circumferential groove 165 in the valve member 154 and vent 166 in the valve body. Upon movement of valve member 154 to its second position (to the left in Fig. 10) and with valve member 155 in its position shown in the drawing, axially spaced seals 197 on the telescoping portion 156 of the valve member are moved to be situated to either side of passageway portion 158 and hence block flow through inlet 151. At the same time, such movement again removes seal 162 from bore 163 and permits venting of outlet port 152 in the same manner as heretofore described.

Valve members 154 and 155 are made pressure responsive by forming one end thereof, for example, as pistons 168 and 169 each having a sliding seal, as by O-rings 170 with bore 153 of the valve body. The valve members are urged apart to one of their positions by means of a spring 171 which acts in opposition to fluid pressure applied through control pressure ports 172 and 173.

With the foregoing construction, it will be seen that as long as sufficient control pressure is applied through ports 172 and 173 from the liquid level controls 110 on the test separators, the valve members will be held in their first position as shown in Fig. 10. In this position, actuating medium from a source S can be continuously applied through conduit 147 to controller 140. However, should the control pressure from either or both of the separator liquid level controllers fall for one reason or another, either or both of the valve members 154 and 155 will move to their second position. When this happens the actuating medium from supply S is cut off from controller 140 and the latter is vented through conduit 147 and vent 166 to atmosphere thereby rendering it inoperative. Thus, by a single control, intelligence from two separate control points can be applied to govern the operation of a single controlled element and such control will be effective irrespective of whether the intelligence is received simultaneously or separately.

*Automatic fill and run control system*

As another embodiment of this invention, there is provided an automatic fill and run control system for a battery of tanks in which the incoming fluid is automatically switched from one available tank to another and, upon a tank being filled, its outlet will be automatically opened to empty it. In a preferred form, the same signal which causes an inlet to a tank to be closed automatically causes its outlet to be opened and at the same time, the incoming fluid is switched to another available tank. Further in such preferred embodiment, the controls for the inlet and outlet valves of a tank are provided with locks or detents arranged so that both the inlet and outlet valves cannot be opened at the same time.

Figure 13:
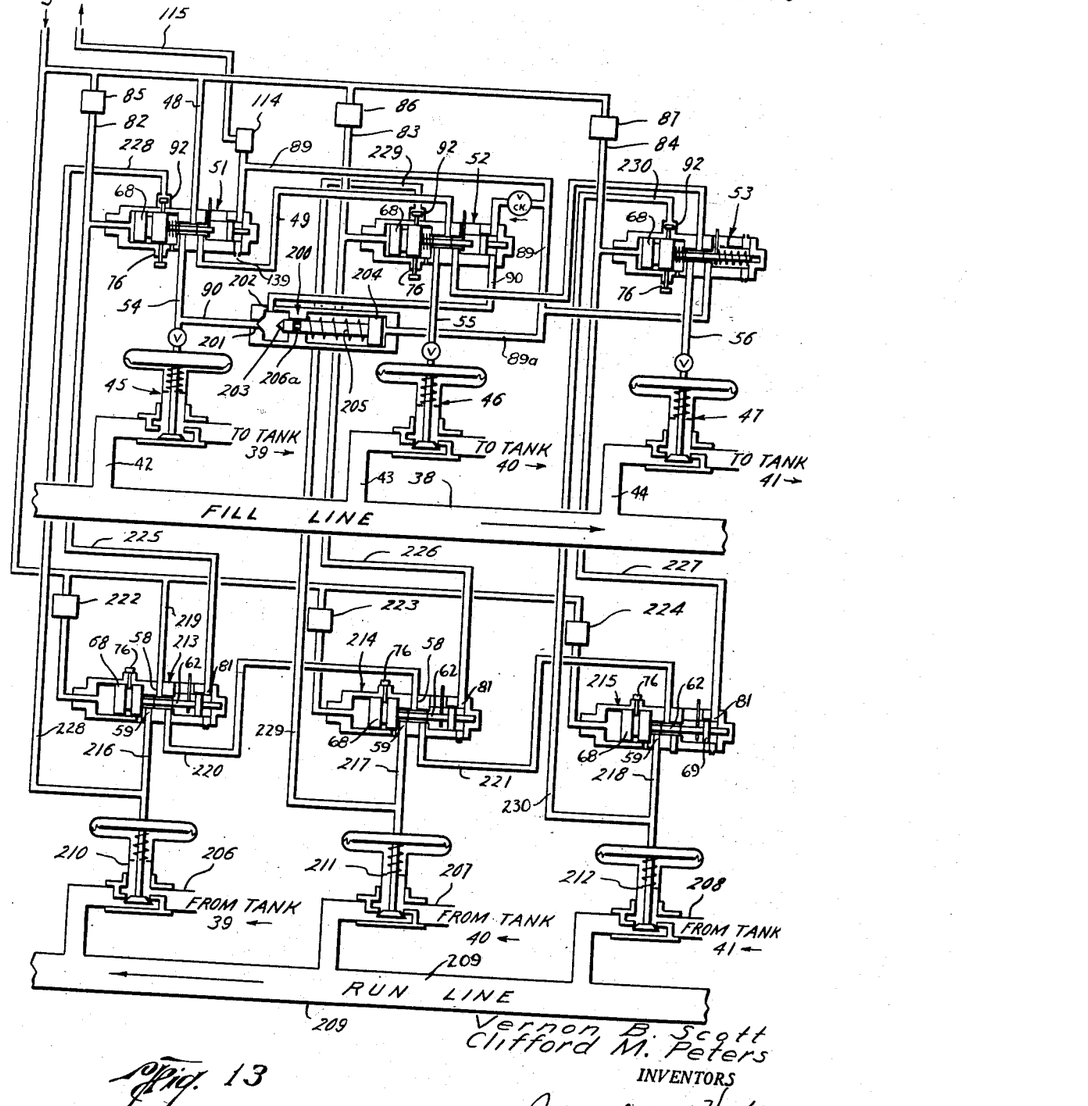
Fig. 13 illustrates another embodiment of the tank switching control system of this invention wherein both the flow into and out of tanks is automatically controlled and switched from one tank to another.

Referring now to Fig. 13, the illustrated control system for the inlet to tanks 39, 40 and 41 (not shown) is generally arranged the same as that shown in Figs. 1, 5 and 6. However, a block valve 200 is illustrated as being installed in conduit 90 to prevent back flow therethrough. Thus, in the instance where all available tanks are filled so that conduit 54 is open to atmosphere through the vent in pilot valve 51, pressure applied through conduit 89 cannot bleed to the atmosphere through pilot valve 52 and conduit 90. The block valve has ports 201 and 202 connected to conduit 90 and flow between these ports is controlled by valve member 203. The latter carries a piston 204 and is biased to unseated position by a spring 205. It carries a seal 206a for forming a seal with a partition in the body housing when the valve member is unseated to prevent escape of fluid from conduit 90. Accordingly, when pressure is applied to conduit 89, valve member 203 will move to seated position under the influence of pressure from conduit 89a and thereby prevent the flow of pressure through conduit 90 to conduit 54. Upon bleeding down conduit 89 through choke 139, the block valve opens and remains in open position so that pressure can be applied thereafter through conduit 90 to cause shifting of pilot valve 52 without such pressure being trapped in pilot valve 52.

Referring now to the emptying or run side of the control system, conduits 206, 207 and 208 are respectively arranged for emptying tanks 39, 40 and 41 into a common run line 209. Each of these outlet lines are controlled by pneumatically operated outlet flow valves 210, 211 and 212. As in the fill side of the control system, each of the outlet valves is provided with selector pilots 213, 214 and 215. These pilot valves, referred to as "run" pilot valves, can be of a construction substantially identical to the "fill" pilot valves shown in Figs. 1, 5, and 6 with the exceptions hereinafter noted.

One of the outlets of each of the run pilot valves is connected by conduits 216, 217 and 218 to the respective outlet flow valves 210–212 so that upon movement of valve member 62 to the left in Fig. 13, pressure can be applied from the inlets of the pilot valves to the outlet flow valves to open the same. This position of the valve members will be referred to as the "run" position and their other position as "switched" position for the sake of simplicity. The run pilot valves are connected in series with a source of actuating medium S by conduits 219, 220 and 221 so that upon movement of a valve member of a run pilot valve to switched position, the actuating medium can be applied to open the next succeeding outlet flow valve.

In order to cause the run pilot valves to move properly between run and switched positions, the tanks are provided with low level liquid level controllers 222, 223 and 224, respectively, which act to permit actuating medium from source S to be applied against the respective ones of pistons 68 of the run pilot valves upon the level in the particular tank falling to a predetermined low height. To cause proper sequential shifting of the pilot valves to run position, their respective ports 81 are connected by conduits 225, 226 and 227 to the high level controllers 85, 86 and 87. With this arrangement, the filling of a tank causes the high level controller to send a signal not only to the proper one of the fill pilot valves to move it to switched position but also to the corresponding one of the run pilot valves to move it to run position. Accordingly, upon the filling of a tank, the flow of fluid thereto is immediately stopped by bleeding off the inlet flow valve and the emptying of the tank immediately started by the application of pressure to the outlet flow valve.

Each of the pilot valves shown in Fig. 13 can be provided with a manual detent means in the fashion illustrated in Fig. 2 so that the filling and emptying of each tank cannot begin until an operator has manually tripped the respective fill and run pilot valves. By eliminating these manual detents or by blocking them in an inoperative position, the entire system can be made automatic so that as soon as one tank is filled, flow is switched to another tank and the filled tank begins to empty.

It is desirable to provide a means for interlocking the pair of fill and run pilot valves on each tank so that the fill pilot valve cannot open the inlet flow valve while the outlet flow valve is open. Such means can be provided by fitting the fill pilot valves with a pressure actuated detent as shown in Fig. 3. and connecting this detent, as by conduits 228, 229 and 230 respectively, to outlet ports 59 of the run pilot valves. Then when a tank becomes filled and the high level controller applies pressure to switch the fill pilot valve to switched position and the run pilot valve to run position, the resultant application of pressure to the outlet flow valve acts through one of conduits 228, 229 and 230 to move the pressure operated detent into groove 79 of the fill pilot valve. This prevents positioning of such pilot valve in fill position until the pressure holding the outlet flow valve in open position has been released to close the same.

While springs 75 have not been illustrated on the run pilot valves, they can be employed. When detents are employed on the run pilot valves, the use of springs 75 permits a detent to be disengaged at any time even before the particular tank becomes filled. Lifting of the detent, of course, permits piston 68 of the particular run pilot valve to move to retracted position so that upon the corresponding tank becoming filled, the signal from the high level controller can immediately move the run pilot valve to run position. Without the spring, it will be necessary to trip the detent after the particular tank has been filled so that pressure will be available to move the run pilot valve to run position.

It will be noted that the last run pilot valve 215 differs from the last fill pilot valve in that it does not employ a spring 80 but instead a piston 69. Also, the first run pilot valve does not have a choke 139.

It is believed the operation of the system shown in Fig. 13 will be obvious from the foregoing but a brief description will be given for the sake of completeness. If it is assumed that tank 39 is being filled and the other tanks are empty, pressure will be applied through fill pilot valve 51 to inlet flow valve 45 during the filling operation to hold it open. Upon such tank becoming filled, high level controller 85 applies pressure through conduit 82 to run pilot valve 51 to move it to switched position thereby opening inlet flow valve 46 to tank 40. At the same time, the signal is applied to run pilot valve 213 to move it to run position whereby tank 39 begins to empty. As soon as the tank has emptied sufficiently, low level controller 222 applies pressure to move run pilot valve 213 to switched position thereby switching pressure from source S to conduit 220 and pilot valve 214. If tank 40 has not as yet completed filling, run pilot valve 214 will still be in switched position thereby preventing application of pressure to outlet flow valve 211. However, immediately when the tank 40 fills, the high level controller therefor switches the fluid inflow to tank 41 and applies pressure through conduit 226 to move run pilot valve 214 to run position. This starts tank 40 emptying. The process is repeated again with respect to tank 41 and after it has filled, its fill pilot valve 53 applies pressure to pilot valves 51 and 52 to urge them to fill position. At such time, it will be noted that the low level controllers of the empty tanks are still applying pressure to the run pilot valves thereof to prevent the outlet flow valves of such tanks from opening. Therefore, when the fill pilot valves of the empty tanks are moved to fill position, liquid cannot flow out of the tanks. It will also be noted that when the manual detents for all of the pilot valves are employed, the disengagement of any of them at any time cannot ever result in both the fill and run pilot valves of a tank being in a position to open both the inlet and outlet flow valves thereto.

From the foregoing description, it will be seen that the control systems are essentially of the non-bleed type. Stated in another manner, there is neither a continuous bleed during the operation of the system nor is it necessary for the functioning of the system to bleed down interconnecting conduits containing actuating medium except for two possible exceptions. One of these is that conduit 89 will be bled down through choke 139 after the fill pilot valves have been shifted and the other is that the conduits connecting the level controllers to the pilot valves will be bled down after the tanks start filling or emptying. Substantially the only other bleeding which occurs is the bleeding off of the diaphragms of the inlet and outlet flow valves.

While the foregoing description has been directed in its more specific aspects to a system which is entirely pneumatic, it will be apparent that the system can be electrified. For example, the inlet and outlet flow valves could be opened and closed by electrical means and pressure actuated electrical switches employed to connect and disconnect such means from a source of electric power responsive to application of pressure from the pilot valves.

From the foregoing it will be seen that this invention is one well adapted to attain all of the ends and objects hereinabove set forth, together with other advantages which are obvious and which are inherent to the apparatus and system.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An automatic tank switching control system for selectively controlling flow into or out of a plurality of tanks each of which have a flow conduit thereto with flow valves in said conduits openable and closable responsive to fluid pressure applied thereto which comprises, in combination, three-way pilot valves each having an inlet, first and second outlets and a valve member movable to switch flow between said outlets, conduit means connecting the pilot valves in series with an outlet of one pilot valve being connected to the inlet of a succeeding pilot valve for series flow through the pilot valves with the valve members thereof in one operative position, conduit means connecting the other outlets of the pilot valves to respective ones of the flow valves for application of fluid pressure to the flow valves when the valve members of the respective pilot valves are in another operative position, and means for moving said valve members from said one to said another position responsive to the liquid level in the respective tanks being at a predetermined height therein.

2. In a tank switching system wherein a plurality of tanks are each provided with a flow conduit and pressure operated flow valves controlling flow through the tank conduits, a pilot valve for each of the flow valves, conduit means connecting the pilot valves for series flow therethrough with the pilot valves in one operative position and for individual flow to the respective flow valves with the pilot valves in another operative position, and means for actuating each of said pilot valves from said another to said one operative position responsive to the liquid level in the respective tanks arriving at a predetermined level therein.

3. In a tank switching system wherein a plurality of tanks are provided with flow conduits and flow valves controlling flow through such flow conduits, said flow valves each having a means for actuating the same, a series of pilot means, one for each flow valve, energy conducting means connecting the pilot means in series and individually to each actuating means, said pilot means being operable to apply an actuating medium to their respective actuating means and then being actuatable to switch said medium from said respective actuating means to a succeeding pilot means for series flow thereto, means for actuating the pilot means to cause said switching responsive to the respective tanks having a predetermined liquid level therein, and means controlled by the last pilot means in said series for urging the other pilot means to an operating position such as to render them operable to again apply said actuating medium to their respective flow valve actuating means.

4. In a tank switching system wherein a plurality of tanks are each provided with a flow conduit and a flow valve controlling flow through such conduit, an energy conducting means common to all the flow valves and having branches each connected to one of said flow valves, a plurality of switching means one to control each flow valve and operable to interrupt flow of energy in said common conducting means to a succeeding flow valve while permitting flow of energy to the flow valve controlled thereby and then being actuatable to interrupt energy flow to the flow valve controlled thereby while permitting flow to a succeeding flow valve, a plurality of level control means for said tanks, the level control means for each tank being connected to the switch means controlling the flow valve for such tank and operable, upon the liquid level in such tank arriving at a predetermined level, to cause the switch means to interrupt flow of energy to the flow valve controlled thereby and permit flow of energy to a succeeding switch means and flow valve.

5. In a tank switching system wherein a plurality of tanks are each provided with a flow conduit and a flow valve controlling flow through such conduit, means for actuating each of the flow valves including a series of pilot means, one for each flow valve, energy conducting means connecting the pilot means in series and also individually to each actuating means, said pilot means being operable to apply an energizing medium to their respective actuating means and then being actuatable to switch such medium from said respective actuating means to a succeeding pilot means for series flow thereto, means for actuating the pilot means to cause said switching responsive to the respective tanks having a predetermined liquid level therein, and means controlled by one pilot means for urging the other pilot means to an operating position such as to render them operable to again apply said energizing medium to their respective flow valve actuating means.

6. In a tank switching system wherein tanks are each provided with a flow conduit and a valve controlling flow through such conduit, pilot means having one outlet connected to each valve for opening and closing same and also having another outlet and an inlet, an energy conductor connecting the pilot means in series with the connection being from said another outlet of one pilot means to the inlet of a succeeding pilot means, a part in each pilot means switchable between a first position connecting the inlet of such pilot means to said one outlet and a second position connecting said inlet to said another outlet, and means for switching said pilot means parts to said second position responsive to the liquid level in a corresponding tank arriving at a predetermined height therein.

7. The system of claim 6 in combination with means for urging the pilot means part of one pilot means toward said first position responsive to a pilot means part of another pilot means moving to its second position.

8. The system of claim 6 in combination with releasable detent means locking said pilot means parts in their second positions upon their movement thereto.

9. In a tank switching system wherein a plurality of tanks are each provided with a flow conduit controlled by a pressure actuated flow valve, a plurality of pilot valves each having a first outlet connected to a flow valve, the pilot valves also having an inlet and a second outlet and a valve member, said member being movable between a first position at which it provides communication between the inlet and the first outlet and a second position where it provides fluid communication between the inlet and said second outlet, conduit means connecting said second outlet of one pilot valve to the inlet of a succeeding pilot valve for series flow therethrough, liquid level control means for each tank respectively operable to move the valve member of the respective pilot valve for such tank to its second position responsive to the liquid level in the tank arriving at a predetermined level, and means for locking the valve members in their second positions upon movement thereto but operable to permit their movement to their first positions when a tank is ready to be filled or drained.

10. The system of claim 9 wherein said pilot valves each include a pressure responsive means for moving the valve members to their second positions responsive to pressure applied to the pressure responsive means, the liquid level control means being operable to so apply pressure to the said pressure responsive means.

11. The system of claim 10 wherein said pressure responsive means engage the valve members to move them to their second positions but are free to move in an opposite direction without moving the valve members, and resilient means urging the pressure responsive means in said opposite direction.

12. The system of claim 11 wherein said locking means comprises a manual detent engageable with said pressure responsive means.

13. The system of claim 11 wherein said locking means comprises a pressure actuated detent engageable with said pressure responsive means, and pressure means for actuating said detent to cause it to engage said pressure responsive means responsive to the opening of another flow valve in another flow conduit connected to the corresponding tank.

14. The system of claim 9 wherein the pilot valves except the last one in the series include a pressure responsive means for moving the valve members toward their first position, and conduits connecting the second outlet of the last pilot valve in the series to the preceding pilot valves to apply pressure to the last mentioned pressure responsive means responsive to movement of the valve member of the last pilot valve to its second position.

15. The system of claim 14 wherein the flow conduits to the tanks are connected to a common header having a master valve therein adapted to close to prevent flow to the tanks, time delay means connected to the master valve and to the second outlet of the last pilot valve for closing the master valve responsive to the application of pressure to the time delay means from said last valve's second outlet for longer than a predetermined interval.

16. In a tank switching system wherein tanks are each provided with a flow conduit and a pressure operated valve controlling flow through such conduit, a plurality of pilot valves one for each flow valve; each of said pilot valves including an inlet and first and second outlets, a valve member movable to switch flow to be from the inlet to the first outlet and then the second outlet upon movement of the valve member between first and second positions respectively, first and second pressure responsive means for respectively urging the valve member to its first and its second positions, means for holding the valve member in its second position but releasable to permit it to move to its first position when urged to do so by the first pressure responsive means; first conduit means connecting the first outlets of the pilot valves to the respective ones of the flow valves and the second outlet of a pilot valve to the inlet of a succeeding pilot valve for series flow through the pilot valves with their valve members in their second positions; second conduit means connecting the second outlet of the last pilot valve in the series to the first pressure responsive means of the preceding pilot valves in the series; and liquid level control means one for each of the tanks, each liquid level control means being connected to the second pressure responsive means of the particular pilot valve connected to the flow valve for such tank and operable to apply pressure thereto upon the liquid level of such tank arriving at a predetermined height.

17. The system of claim 16 in combination with conduit means connecting the first outlet of one pilot valve with the first pressure responsive means of a succeeding pilot valve to urge the valve member of the succeeding pilot valve toward its first position when the valve member of said one pilot valve is in its first position.

18. In a tank switching system wherein a plurality of tanks are each provided with an inlet flow conduit controlled by inlet flow valve and wherein the inlet conduits are connected to an inlet header controlled by a master flow valve: means for closing the inlet flow valves responsive to filling of their respective tanks to a predetermined level and for opening an inlet flow valve of a succeeding tank responsive to the closing of a preceding inlet flow valve, including a series of pressure responsive pilot valves, the pilot valves having inlets and outlets, conduits connecting the outlet of one pilot valve to the inlet of a succeeding pilot valve in the series, conduit means connecting the outlet of the last pilot valve in the series with preceding pilot valves in the series so that upon flow of pressure fluid to said last pilot valve outlet, pressure will be applied to the preceding pilot valves to place them in position to permit opening of the inlet flow valves connected thereto; and means actuatable responsive to all of said inlet flow valves being in closed position for closing said master valve, including a relay valve having an inlet connected to the last-mentioned conduit means and having an outlet for the application of pressure to actuate said master valve, a valve member controlling flow between the inlet and outlet of the relay valve, and a restriction in the outlet of the relay valve to delay the application of sufficient pressure to actuate said master valve until sufficient pressure has been applied to said preceding pilot valves to urge them to inlet flow valve opening position.

19. In a well gathering system wherein a plurality of wells are connected to a manifold means, a pair of separators connected in parallel with each other and to said manifold means, control means for individually connecting said wells successively to said manifold means and operable by fluid pressure, and means for supplying pressure to said control means and interrupting said supply when the level in either of said separators changes beyond a predetermined height therein including a liquid level controller for each separator adapted to transmit pressure fluid when the levels in the separators has not reached said height and to interrupt such transmission when the levels change beyond said height, a shut-off valve having an inlet adapted to be connected to a source of fluid pressure and an outlet connected to said controller to supply operating fluid pressure thereto, said shut-off valve also having a pair of valve members which when positioned in a first position provide communication between said inlet and outlet and upon movement of either valve member to a second position, interrupts said communication, pressure responsive means urging the valve members toward their first positions, and conduit means connecting said pressure responsive means respectively to said level controllers on said separators.

20. An automatic system for selectively controlling the flow of fluid into various ones of a plurality of tanks and for automatically emptying such tanks, each of said tanks having inlet and outlet conduits with inlet and outlet flow control valves therein, means for closing the inlet flow valve to a filled tank and for opening the inlet flow valve to an empty tank to switch flow thereinto from the filled tank responsive to the filled tank filling to a predetermined high level, means for opening the outlet flow valve of said filled tank responsive to closing of the inlet flow valve thereto, and means for closing the outlet flow valve to the filled tank responsive to emptying thereof to a predetermined low level.

21. The system of claim 20 in combination with means locking the inlet flow valve of said filled tank in closed position while the outlet flow valve thereof is open, said locking means being rendered effective responsive to opening of the outlet flow valve of the filled tank.

22. The system of claim 20 wherein said means for closing and opening said inlet flow valves includes means for applying energy to each of the inlet flow valves to actuate the same, switching means operable to govern the application of such energy so that an inlet flow valve of an empty tank is opened responsive to closing of an inlet flow valve of a filled tank, and means for actuating the switching means to so govern the application of energy responsive to the last-mentioned tank filling to a predetermined level.

23. The system of claim 22 wherein the means for opening the outlet flow valve of the filled tank is actuated responsive to said actuating means.

24. In a tank switching control system wherein a plurality of tanks are each provided with inlet and outlet conduits having inlet and outlet flow valves therein, pilot valve means for switching an actuating medium from one inlet flow valve to another so that said inlet flow valves are opened and closed in succession to switch flow from a filled tank to an empty tank, liquid level control means connected to the pilot valve means to cause said switching of said actuating medium responsive to the liquid level in a filled tank rising to a predetermined height, pilot valve means for controlling the opening and closing of said outlet flow valves, the last-mentioned pilot valve means causing opening of an outlet flow valve for a particular tank upon flow being switched from such tank to another, and means governing operation of the last-mentioned pilot valve means to close a particular outlet flow valve responsive to the level in a tank from which flow is governed by such outlet flow valve falling to a predetermined low level.

25. The system of claim 24 in combination with means preventing the first-mentioned pilot valve means from opening the inlet flow valve to a tank while its outlet flow valve is open, said preventing means being rendered effective responsive to opening of said outlet flow valve.

26. In a tank switching control system wherein a plurality of tanks are each provided with inlet and outlet conduits having inlet and outlet flow valves therein, means for applying energy to the inlet and outlet flow valves to actuate the same, switching means operable to control the application of energy from said energy applying means to said inlet flow valves and actuatable to cause the opening of an inlet flow valve of an available empty tank upon closing of an inlet flow valve of a filled tank, means for actuating the switching means to cause such opening and closing responsive to liquid level in a tank being filled reaching a predetermined high level, switching means operable to control the application of energy from said energy applying means to the outlet flow valves, the last-mentioned switching means causing opening of an outlet flow valve of a filled tank responsive to said actuating means causing the closing of the inlet flow valve to such filled tank.

27. In a tank switching system wherein a plurality of tanks are provided with flow conduits and flow valves controlling flow through such conduits, said flow valves each having means for actuating the same, a series of relay means, one for each flow valve, energy conducting means connecting the relay means in series and individually to each actuating means, said relay means being operable to apply energy from the energy conducting means to their respective actuating means to actuate the respective flow valve therefor and then to switch said energy from said respective actuating means to a succeeding relay means for series flow thereto, means to actuate the relay means to cause said switching responsive to their respective tanks having a predetermined liquid level therein, and means controlled by a succeeding relay means for actuating at least one preceding relay means in the series thereof to move it from switched position so as to render it operable to apply energy to its respective actuating means.

28. The system of claim 27 in combination with second flow conduits respectively connected to said tanks and having second flow valves therein, and means holding at least one of the relay means in switched position while its respective second flow valve is open.

References Cited in the file of this patent

UNITED STATES PATENTS

| | | |
|---|---|---|
| 2,168,254 | Bischoff | Aug. 1, 1939 |
| 2,399,938 | Pett | May 7, 1946 |
| 2,572,621 | Hobson | Oct. 23, 1951 |
| 2,605,780 | Nance | Aug. 5, 1952 |
| 2,619,105 | Hauser | Nov. 25, 1952 |
| 2,729,227 | Hearn | Jan. 3, 1956 |
| 2,729,232 | Hughes | Jan. 3, 1956 |
| 2,751,924 | Hynd | June 26, 1956 |